H. H. C. GRONDAHL.
MECHANISM FOR CUTTING CORDS OR STRANDS.
APPLICATION FILED SEPT. 29, 1919.

1,374,200.

Patented Apr. 12, 1921.

Inventor
Hans Henrik C. Grondahl
by J. G. Roberts
Atty.

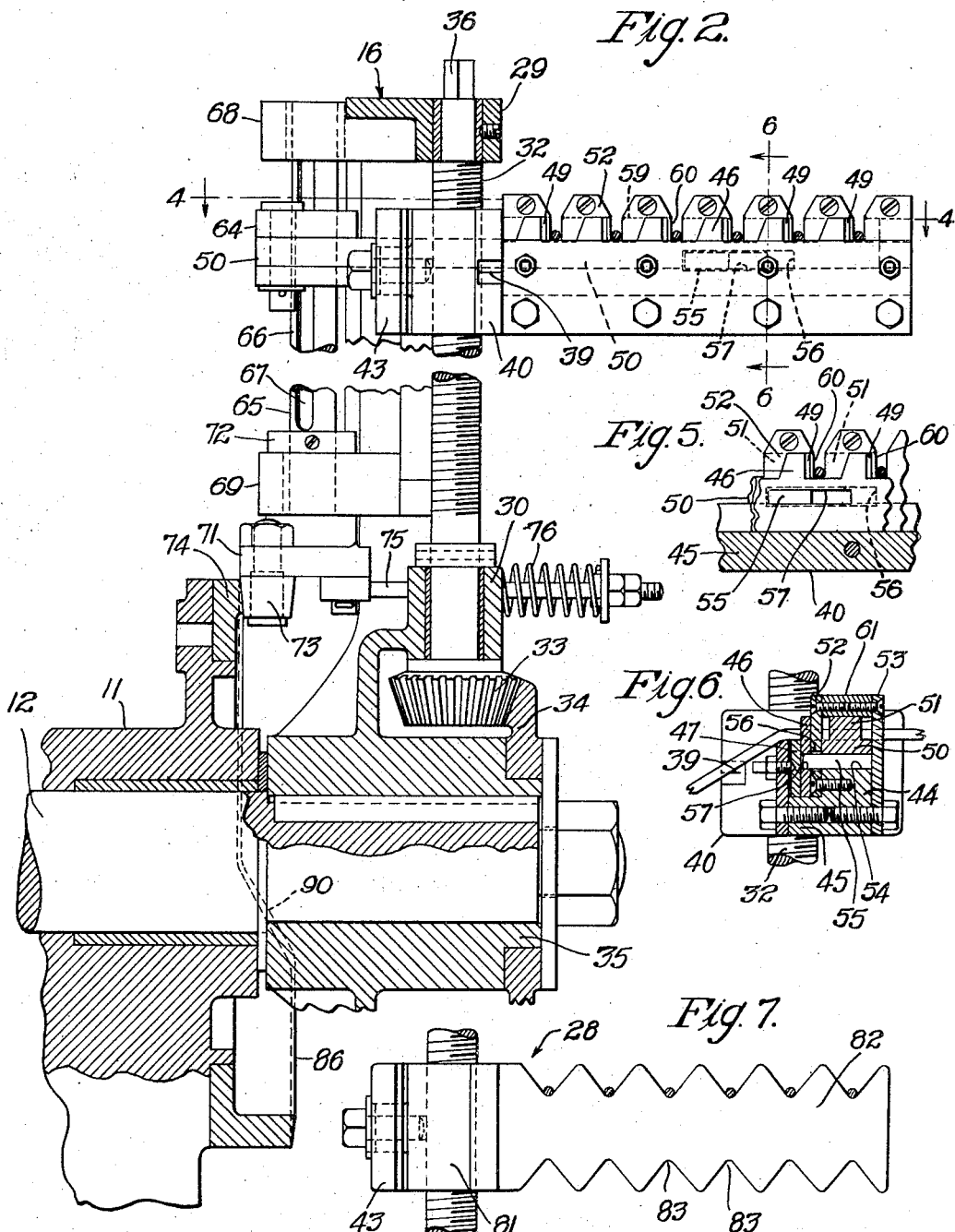

H. H. C. GRONDAHL.
MECHANISM FOR CUTTING CORDS OR STRANDS.
APPLICATION FILED SEPT. 29, 1919.
1,374,200.
Patented Apr. 12, 1921.
3 SHEETS—SHEET 3.
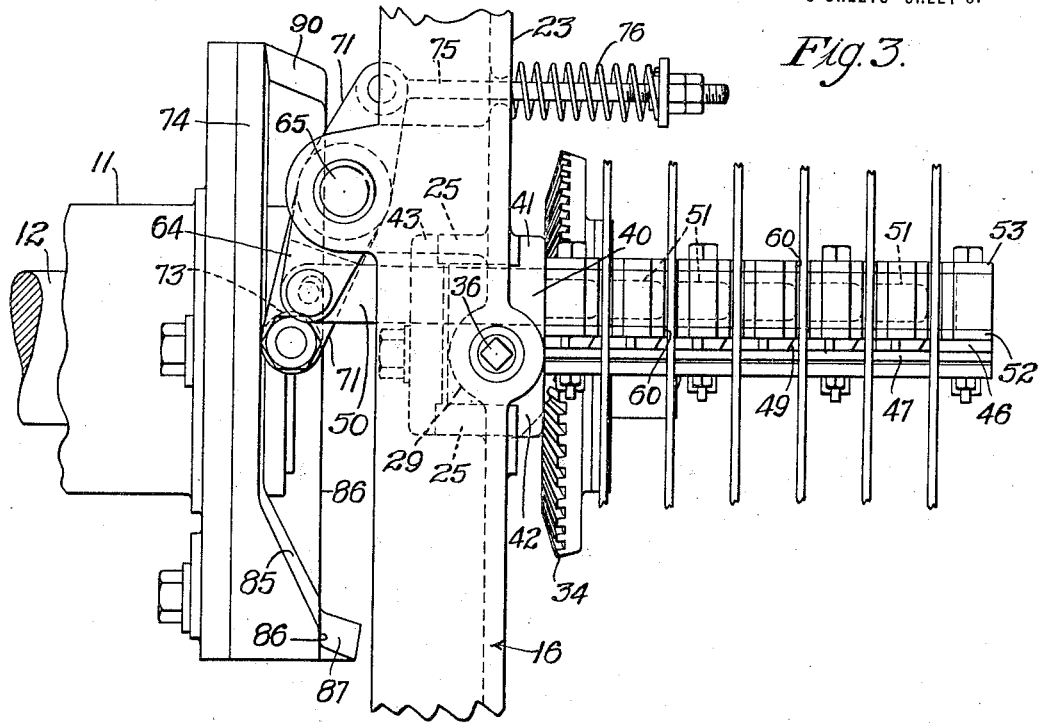
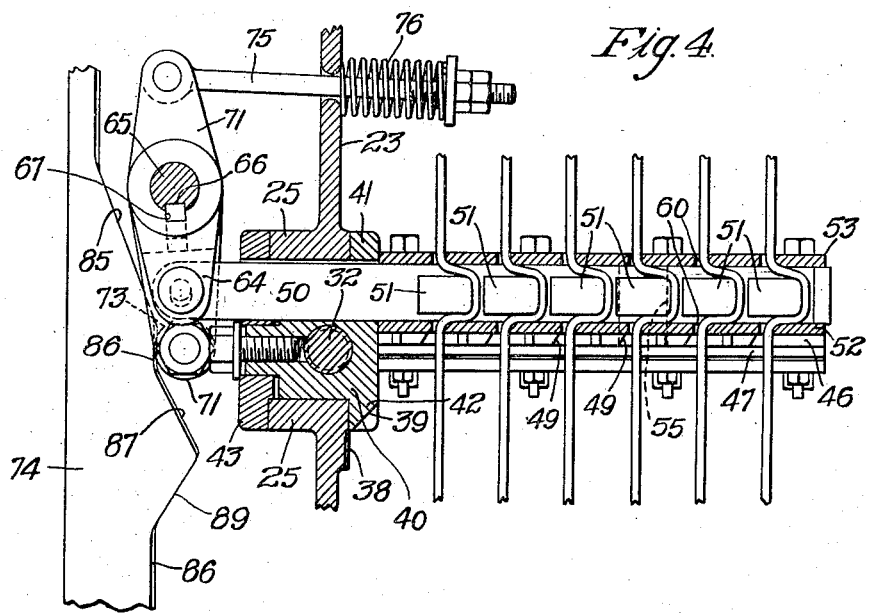
Inventor
Hans Henrik C. Grondahl
by J. E. Roberts Atty.

UNITED STATES PATENT OFFICE.

HANS HENRIK C. GRONDAHL, OF CHICAGO, ILLINOIS, ASSIGNOR TO WESTERN ELECTRIC COMPANY, INCORPORATED, OF NEW YORK, N. Y., A CORPORATION OF NEW YORK.

MECHANISM FOR CUTTING CORDS OR STRANDS.

1,374,200.

Specification of Letters Patent.  Patented Apr. 12, 1921.

Application filed September 29, 1919. Serial No. 327,064.

*To all whom it may concern:*

Be it known that I, HANS HENRIK C. GRONDAHL, a citizen of the United States, residing at Chicago, in the county of Cook and State of Illinois, have invented certain new and useful Improvements in Mechanism for Cutting Cords or Strands, of which the following is a full, clear, concise, and exact description.

This invention relates to a mechanism for cutting cords or strands, and has for its object to provide a mechanism whereby cords or strands of given lengths may be cut from continuous lengths with speed and accuracy and with a minimum of manual labor.

In accordance with the general features of this invention there is provided a constantly moving frame which carries a plurality of clamping and cutting devices which are operated at different points in the movement of the frame to successively clamp, cut, and then release the cord which has been cut. Means are also provided for guiding the cord between the clamping and cutting devices. This same means also serves to keep a substantially constant tension on the cord while being drawn from the supply reel. Mechanism is also provided for varying the length of cord to be cut by adjusting the clamping and cutting devices and the guide means on the frame.

In the drawings illustrating the invention:

Fig. 2 is an enlarged fragmentary sectional view taken on the line 2—2 of Fig. 1;

Fig. 3 is a plan view thereof;

Fig. 4 is a plan section taken on the line 4—4 of Fig. 2 showing the cord clamped and about to be cut;

Fig. 5 is a fragmentary detail view of the clamping and cutting mechanism;

Fig. 6 is a detail sectional view taken on the line 6—6 of Fig. 2, and

Fig. 7 is a front view of a cord guide.

Figure 1:
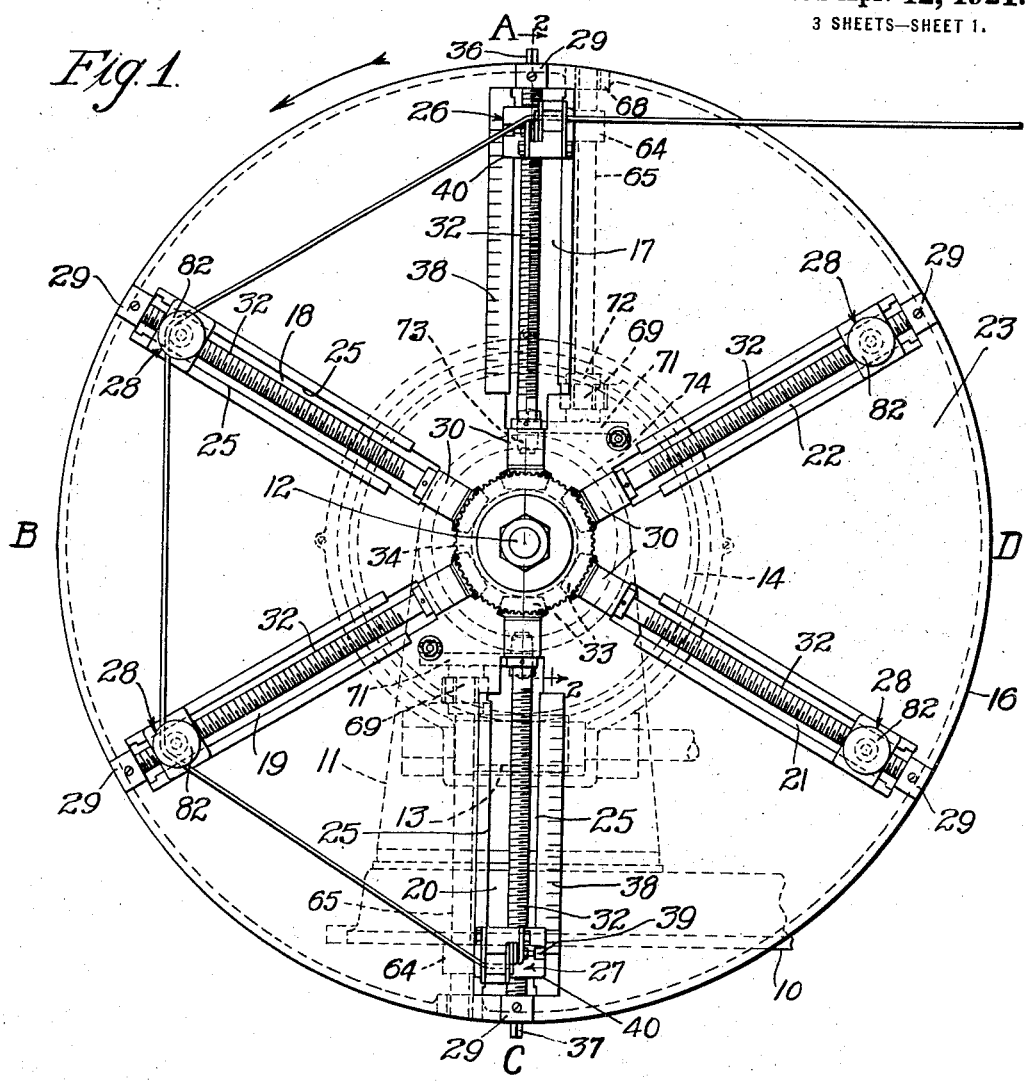
Figure 1 is a side elevation of a machine embodying the features of the invention with the driving motor and part of the base omitted.

As shown in the drawings, the machine is supported from a base 10 carrying a standard 11 which supports a shaft 12. The shaft 12 is driven from a motor (not shown) through suitable driving connections part of which are indicated by a worm 13 and a worm gear 14 secured on the shaft 12. Keyed onto one end of the shaft 12 is a disk shaped member 16 provided with radially extending slots 17, 18, 19, 20, 21, and 22 formed in its side face 23. These slots are equipped with flanges 25—25.

Adjustably carried in the slots 17 and 20 are clamping and cutting members 26 and 27 and in the slots 18, 19, 21, and 22 are carried guide members 28—28 which are also adjustable in the slots. The slots terminate in bosses 29—29 at their outside ends, and at their inside ends in bosses 30—30. Rotatably secured in bosseses 29—29 and 30—30 and between the flanges 25—25 of the slots are screw rods 32—32 which pass through threaded openings in the clamping and cutting members 26 and 27 and the guide members 28—28. Secured to the lower end of each screw rod 32 are bevel gears 33—33 which mesh with a bevel gear 34 rotatably loose on a hub portion 35 of the disk shaped member 16. The screw rods 32—32 mounted in slots 17 and 20 terminate at their outside ends in nut shaped projections 36 and 37 respectively. By turning either projection 36 or 37 with a suitable tool in either direction the clamping and cutting members 26 and 27 and the guide members 28—28 will be either raised or lowered in the slots through the engagement of the bevel gears 33—33 with the bevel gear 34. A suitable scale 38 is marked on the disk shaped member 16 to one side of the slots 17 and 20 and which with a marking 39 on a bracket 40 of the clamping and cutting members 26 and 27 facilitates the setting of the machine to cut certain lengths of cords.

The clamping and cutting members 26 and and 27 are identical in construction and consist of a main supporting bracket 40 which is adjustably secured in the slot 17. One side of the bracket 40 is equipped with flanges 41 and 42 which with a plate 43 suitably mounted on the opposite side thereof secure the bracket 40 against movement except in response to the rotation of the screw rod 32. An extended portion 44 of the bracket 40 is provided with a ledge 45 on which is mounted a slidable knife blade 46 which is held in place thereon by an adjustable retaining plate 47. The machine as shown is equipped for cutting six cords into fixed lengths simultaneously and the knife blade therefor has six cutting edges 49—49. On the top surface of the extended portion 44 of the bracket 40 is a slidable clamping bar 50 provided with six clamping lugs 51—51. The clamping lugs 51—51 are less than the width of the clamping bar 50 which is of the same width as the top surface of the portion 44 and are set to one side of the center thereof leaving a space on the side nearest the knife blade 46 of approximately the diameter of the cords to be cut. Secured to the extended portion 44 of the bracket 40 and extending upward on both sides of the clamping bar 50 and forming guides therefor are plates 52 and 53. The plate 52 forms a spacer for the knife blade 46 and the clamping bar 50. Snugly fitting in a slot 54 in the lower surface of the clamping bar 50 and contacting with the upper surface of the extended portion 44 of the bracket 40 is a key 55. One end of the key 55 contacts with the inside surface of the plate 53 and the other end passes through a slot 56 in the plate 52 and enters a slot 57 in the knife blade 46. The slot 57 is of such a width that a movement of the clamping bar 50 which carries the key 55 will not slide the knife blade 46 until after the cords have been clamped between the clamping lugs 51—51 and the inside wall of the guiding plate 52.

After the cords have been clamped, a further movement of the clamping bar 50 brings the key 55 into engagement with the end wall of the slot 57 in the knife blade 46 which will slide the knife blade and cause it to cut the cords.

Notches 60—60 are cut in the guiding plates 52 and 53 in line with the space between the clamping lugs 51—51 when they are in their initial position which allows the cords to drop after being cut and released. Retaining and spacing pieces 61—61 are fastened between the guiding plates 52 and 53 and between the notches 60—60 therein. The slot 56 in the guide plate 52 is of sufficient length to allow for the full movement of the key 55. It will be clearly observed that after the cords have been clamped in the narrow space between the clamping lugs 51—51 and the guiding plate 52 any further movement of the clamping bar 50 to cause the knife blade 46 to operate will draw the cords from the supply ends of the cords and will not disturb the cord on the knife side of the clamping bar.

One end of the clamping bar 50 is suitably pivoted to a forked end of a lever 64. The lever 64 is adapted to be rocked with a shaft 65 by means of a key 66 secured to the lever 64 and which is slidable lengthwise of the shaft 65 by engaging in a key-way 67 therein. The upper and lower ends of the shaft 65 are free to rotate in bosses 68 and 69 integral with the disk shaped member 16. Secured to the lower end of the shaft 65 and below the boss 69 is a roller arm 71. The roller arm 71 on the lower side of the boss 69 and a collar 72 secured to the shaft 65 on the upper side of the boss 69 lock the shaft 65 from moving lengthwise. On one end of the roller arm 71 is a roller 73 which contacts with a stationary and circular cam 74 secured on the standard 11.

The cam 74 is suitably mounted on the standard 11 so as to be rotatably adjustable thereon. On the opposite end of the roller arm 71 is pivoted a rod 75 which passes through a suitable opening in the side face 23 of the disk shaped member 16. Mounted around the rod 75 and between the side face 23 of the disk shaped member 16 and an adjustable collar on the rod 75 is a compression spring 76 which acts on the roller arm 71 to cause the roller to always follow the face of the cam 74.

The guide members 28—28 each consist of a main support 81 which is carried by and is adjustable on the disk shaped member 16 in a similar manner to the mounting of the clamping and cutting members 26 and 27. Suitably secured to the support 81 is a stud 82 provided with circular grooves 83—83 for guiding the cords.

The guide members 28—28 in addition to guiding the cord between the clamping and cutting members 26 and 27 also serve to keep a substantially constant tension on the cord as it is drawn from the supply reel.

A suitable rail may be located below the disk shaped member 16 to catch the cords when they drop after being cut and released.

To help in the explanation of the operation of the machine positions, A, B, C, and D have been denoted on Fig. 1.

Before operating the machine the operator will first turn either screw rod 32—32 of the clamping and cutting members 26 and 27 by means of a suitable tool, engaging either nut shaped projection 36 or 37. By turning the screw rod 32 until the marking 39 on the clamping and cutting member 26 is in line with a mark on the scale 38 which agrees with the length of cord to be cut, the machine can be set to cut the desired length of cords. As shown in Fig. 1, the machine is set for approximately the maximum length of cord which can be cut. By moving the clamping and cutting members and the guide members closer to the axis of the machine the cord will be cut into shorter lengths. The length of cord cut will be the distance between the cutting points on the clamping and cutting members with the cord guided over the studs as shown.

With the machine operating in the direction indicated by the arrow in Fig. 1 the roller 73 on the roller arm 71 of the clamping and cutting member 26 will ride up an inclined surface 85 on the cam 74 between the points A and B. This movement of the roller 73 will turn the roller arm from the position shown in Fig. 3 to that shown in Fig. 4. This movement of the roller arm causes the clamping bar 50 to be moved to its clamping position as shown in Fig. 4. At this time the key 55 carried by the clamping bar will be in contact with the other end of the slot 57 in the knife blade 46. After moving up the incline 85 on the cam the roller rides on a flat surface 86 a short distance after which it rides up a second inclined surface 87 just as the clamping and cutting member 26 reaches position B.

The roller 73 riding up the inclined surface 87 causes the clamping bar 50 to be moved still farther and the key 55 carried thereby causes the knife blade 46 to be operated by the engagement of the key 55 with the other end of the slot 57 in the knife blade. Immediately after cutting the cords the roller rides down an inclined surface 89 to the flat surface 86. This movement returns the knife blade to its initial position.

While the clamping and cutting member 26 is moving from position A to position B with the cord being clamped between these points and then cut just as it reaches position B the other clamping and cutting member 27 is moving from position C to position D with the roller 73 riding on the flat surface 86 which holds the cords clamped. Immediately after the cords have been cut at position B the roller 73 of the clamping and cutting member 27 moves down an inclined surface 90 from the flat surface 86. The compression spring 76 acting on the roller arm 71 causes it to draw the clamping bar 50 back to its initial position thereby releasing the cords which are then free to drop clear of the rotating disk-like member 16 and onto a suitable rail.

Due to the well balanced construction of the machine and the constant speed at which it is operated, the cords to be cut will be drawn from the supply reels at a substantially constant speed and with a substantially constant tension. This allows the machine to be operated at a high rate of speed, and with the cutting of two cords from each cord being drawn from the supply reels for every revolution of the machine the output is very great.

What is claimed is:

1. In a machine for cutting a continuous strand or cord into given lengths, means for drawing said cord or strand from a supply reel at a substantially constant speed, mechanically operated means associated with said drawing means for cutting said cord into lengths as it is drawn from said supply reel, and means carried by said drawing means for varying the position of said cutting means whereby the length of cord to be cut may be varied.

2. In a cord cutting machine, a frame movable at a constant speed for drawing the cord from a supply reel, a plurality of mechanically operated devices comprising clamping bars movable at right angles to the movement of said frame for clamping said cord to and releasing it from the frame during its movement, and means for cutting said cord into given lentghs as it is drawn from said supply reel.

3. In a cord cutting machine, a power driven frame rotating at a constant speed for drawing said cord from a supply reel, a plurality of mechanically operated clamping and cutting devices mounted on said frame comprising clamping and cutter bars movable in a direction parallel to the axis of said frame for successively clamping, cutting, and releasing said cord as it is cut, and means for guiding said cord between said clamping and cutting devices whereby said cord is cut into given lengths as it is drawn from said supply reel.

4. In a cord cutting machine, a power driven frame rotating at a constant speed for drawing said cord from a supply reel, a plurality of combined clamping and cutting devices mounted on said frame for successively clamping, cutting, and releasing said cord as it is cut, a plurality of guide studs for said cord between said clamping and cutting devices, and a cam for operating said clamping and cutting devices whereby said cord is cut into given lengths as it is drawn from said supply reel.

5. In a cord cutting machine, a power driven frame rotating at a constant speed for drawing said cord from a supply reel, a plurality of combined clamping and cutting devices and guide studs equally disposed radially on said frame for keeping a substantially constant tension on said cord as it is drawn from said supply reel, and a stationary cam for operating said clamping and cutting devices whereby said cord is successively clamped, cut, and then released from said frame as it is drawn from said supply reel.

6. In a cord cutting machine, a power driven frame rotating at a constant speed for drawing said cord from a supply reel, a plurality of combined clamping and cutting devices and guide studs adjustable radially on said frame for varying the length of cord to be cut, means for adjusting simultaneously all said clamping and cutting devices and guide studs, and a stationary cam for operating said clamping and cutting devices whereby said cord is successively clamped, cut, and then released from said frame as it is drawn from said supply reel.

7. In a cord cutting machine, a power driven frame rotating at a constant speed, a plurality of combined clamping and cutting devices and guide studs adjustable radially on said frame for varying the length of cord to be cut, and means for adjusting simultaneously all said clamping and cutting devices and guide studs comprising a centrally located driving gear meshing with a plurality of pinions operatively connected with all of said clamping and cutting devices and guide studs including means for operating one of said pinions whereby all of said pinions are operated.

In witness whereof I hereunto subscribe my name this 12th day of September A. D., 1919.

HANS HENRIK C. GRONDAHL.